(12) United States Patent
Evans et al.

(10) Patent No.: US 6,577,746 B1
(45) Date of Patent: Jun. 10, 2003

(54) WATERMARK-BASED OBJECT LINKING AND EMBEDDING

(75) Inventors: Douglas B. Evans, San Francisco, CA (US); William Y. Conwell, Portland, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/473,396

(22) Filed: Dec. 28, 1999

(51) Int. Cl.[7] .............................................. G06K 9/100
(52) U.S. Cl. ....................... 382/100; 705/57; 707/101; 707/104.1
(58) Field of Search ................................ 382/100, 112, 382/232, 305, 312, 306; 380/54; 235/375; 399/27; 358/400, 403, 462, 440, 1.18; 703/1; 345/440; 705/57; 707/104.1, 101

(56) References Cited

U.S. PATENT DOCUMENTS

| | | | |
|---|---|---|---|
| 3,569,619 A | 3/1971 | Simjian | 235/380 |
| 3,984,624 A | 10/1976 | Waggener | 348/473 |
| 4,230,990 A | 10/1980 | Lert, Jr. et al. | 725/22 |

(List continued on next page.)

FOREIGN PATENT DOCUMENTS

| | | | | |
|---|---|---|---|---|
| CA | 2235002 | 12/1998 | | |
| EP | 493 091 | 7/1992 | | |
| EP | 0789480 | 8/1997 | | |
| EP | 872995 | 10/1998 | | |
| EP | 0642060 B1 | 4/1999 | | |
| JP | 08-50598 | 2/1996 | | |
| WO | WO94/27228 | 11/1994 | | |
| WO | WO95/04665 | 2/1995 | | |
| WO | WO95/10813 | 4/1995 | | |
| WO | WO97/43736 | 11/1997 | | |
| WO | WO98/14887 | 4/1998 | | |
| WO | WO98/20642 | 5/1998 | | |
| WO | WO98/24050 | 6/1998 | | |
| WO | WO98/40823 | 9/1998 | | |
| WO | WO98/49813 | 11/1998 | | |
| WO | WO99/34277 | 7/1999 | | |
| WO | WO99/36876 | 7/1999 | | 382/100 |
| WO | WO00/44131 | 7/2000 | | |
| WO | WO 01/80169 | 10/2001 | | 382/100 |

OTHER PUBLICATIONS

Zhao, "A. WWW Service to Embed and Prove Digital Copyright Watermarks," Fraunhofer Institute for Computer Graphics, Proc. of EU Conf. on Multimedia Applications, Services and Techniques, May 1996, 15 pages.

Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.

(List continued on next page.)

*Primary Examiner*—Jayanti K. Patel
(74) *Attorney, Agent, or Firm*—Steven W. Stewart; Digimarc Corporation

(57) ABSTRACT

OLE-like principles are implemented using watermark data in digital objects in order to effect object linking or embedding. In one embodiment, a photocopier scans an original paper document to produce image data. This image data is analyzed for the presence of watermark data identifying a graphic on the document. With this watermark identifier, the photocopier can query a remote image database for pristine image data corresponding to the scanned graphic. This pristine data can be relayed from the remote database to the photocopier and substituted into the scanned image data. Output printed from the photocopier is thus based, at least in part, on pristine image data, rather than on image data that has been subjected to various corruption mechanisms (e.g., degradation of the original paper document, artifacts due to scanning, etc.). A "photocopy" better than the "original" can thereby be achieved.

19 Claims, 1 Drawing Sheet

U.S. PATENT DOCUMENTS

| | | |
|---|---|---|
| 4,238,849 A | 12/1980 | Gassmann .................. 348/467 |
| 4,296,326 A | 10/1981 | Haslop et al. ................. 283/70 |
| 4,297,729 A | 10/1981 | Steynor et al. ............... 360/40 |
| 4,313,197 A | 1/1982 | Maxemchuk ............... 370/210 |
| 4,367,488 A | 1/1983 | Leventer et al. ............ 370/204 |
| 4,379,947 A | 4/1983 | Warner ........................ 370/204 |
| 4,380,027 A | 4/1983 | Leventer et al. ............ 348/467 |
| 4,395,600 A | 7/1983 | Lundy et al. ................ 381/73.1 |
| 4,425,642 A | 1/1984 | Moses et al. ................ 370/477 |
| 4,528,588 A | 7/1985 | Löfberg ........................ 340/5.1 |
| 4,547,804 A | 10/1985 | Greenberg .................. 348/460 |
| 4,618,257 A | 10/1986 | Bayne et al. .................. 356/71 |
| 4,672,605 A | 6/1987 | Hustig et al. ................ 370/201 |
| 4,675,746 A | 6/1987 | Tetrick et al. ............... 358/294 |
| 4,739,377 A | 4/1988 | Allen .......................... 355/133 |
| 4,750,173 A | 6/1988 | Bluthgen ..................... 370/528 |
| 4,807,031 A | 2/1989 | Broughton et al. .......... 348/460 |
| 4,855,827 A | 8/1989 | Best ............................ 348/485 |
| 4,879,747 A | 11/1989 | Leighton et al. ............. 713/186 |
| 4,888,798 A | 12/1989 | Earnest ......................... 705/54 |
| 4,908,836 A | 3/1990 | Rushforth et al. ........... 375/152 |
| 4,908,873 A | 3/1990 | Philibert et al. ............ 382/100 |
| 4,944,036 A | 7/1990 | Hyatt ............................ 367/43 |
| 4,947,028 A | 8/1990 | Gorog ......................... 235/380 |
| 4,969,041 A | 11/1990 | O'Grady et al. ............. 348/473 |
| 4,972,476 A | 11/1990 | Nathans ....................... 713/186 |
| 4,977,594 A | 12/1990 | Shear ........................... 705/53 |
| 5,023,907 A | 6/1991 | Johnson ....................... 710/200 |
| 5,027,401 A | 6/1991 | Soltesz ......................... 380/54 |
| 5,040,059 A | 8/1991 | Leberl ......................... 348/135 |
| 5,053,956 A | 10/1991 | Donald ........................ 713/601 |
| 5,062,666 A | 11/1991 | Mowry et al. ................. 283/67 |
| 5,095,196 A | 3/1992 | Miyata ........................ 235/382 |
| 5,103,459 A | 4/1992 | Gilhousen et al. ........... 370/206 |
| 5,113,445 A | 5/1992 | Wang ............................ 380/51 |
| 5,146,457 A | 9/1992 | Veldhuis et al. ............. 370/523 |
| 5,181,786 A | 1/1993 | Hujink .......................... 400/61 |
| 5,200,822 A | 4/1993 | Bronfin et al. ................ 725/22 |
| 5,213,337 A | 5/1993 | Sherman ....................... 463/40 |
| 5,216,724 A | 6/1993 | Suzuki et al. ................ 382/135 |
| 5,243,423 A | 9/1993 | DeJean et al. ............... 348/473 |
| 5,259,025 A | 11/1993 | Monroe ......................... 705/75 |
| 5,280,537 A | 1/1994 | Sugiyama et al. ........... 370/529 |
| 5,288,976 A | 2/1994 | Citron ......................... 235/375 |
| 5,291,243 A | 3/1994 | Heckman et al. ............... 399/3 |
| 5,295,203 A | 3/1994 | Krause et al. ............... 382/248 |
| 5,315,098 A | 5/1994 | Tow ............................ 235/494 |
| 5,321,470 A | 6/1994 | Hasuo et al. ................ 399/366 |
| 5,374,976 A | 12/1994 | Spannenburg ............... 399/366 |
| 5,379,345 A | 1/1995 | Greenberg .................. 455/2.01 |
| 5,416,307 A | 5/1995 | Danek et al. ................ 235/449 |
| 5,428,607 A | 6/1995 | Hiller et al. ................. 370/352 |
| 5,428,731 A | 6/1995 | Powers ..................... 707/501.1 |
| 5,463,209 A | 10/1995 | Figh ............................ 235/383 |
| 5,469,222 A | 11/1995 | Sprague ...................... 348/580 |
| 5,469,506 A | 11/1995 | Berson et al. ............... 713/186 |
| 5,493,677 A | 2/1996 | Bfalogh .................... 707/104.1 |
| 5,495,581 A | 2/1996 | Tsai ............................. 707/526 |
| 5,496,071 A | 3/1996 | Walsh ........................... 283/70 |
| 5,502,576 A | 3/1996 | Ramsay et al. .............. 354/444 |
| 5,521,722 A | 5/1996 | Colvill et al. ................ 358/500 |
| 5,530,759 A | 6/1996 | Braudaway et al. ........... 380/54 |
| 5,530,852 A | 6/1996 | Meske, Jr. et al. ........... 709/206 |
| 5,568,550 A | 10/1996 | Ur ............................... 382/306 |
| 5,592,622 A | 1/1997 | Isfeld et al. ................. 709/207 |
| 5,594,226 A | 1/1997 | Steger ......................... 235/379 |
| 5,598,526 A | 1/1997 | Daniel et al. ................ 345/540 |
| 5,606,609 A * | 2/1997 | Houser et al. .................. 380/4 |
| 5,613,004 A | 3/1997 | Cooperman et al. .......... 380/28 |
| 5,617,119 A | 4/1997 | Briggs et al. ................ 707/100 |
| 5,636,292 A | 6/1997 | Rhoads ........................ 382/232 |
| 5,638,443 A | 6/1997 | Stefik ............................ 705/54 |
| 5,640,193 A | 6/1997 | Wellner ....................... 725/100 |
| 5,646,999 A | 7/1997 | Saito ............................. 705/54 |
| 5,652,626 A | 7/1997 | Kawakami et al. .......... 348/463 |
| 5,659,164 A | 8/1997 | Schmid ....................... 235/375 |
| 5,663,766 A | 9/1997 | Sizer, II ...................... 348/473 |
| 5,664,018 A | 9/1997 | Leighton ...................... 380/54 |
| 5,665,951 A | 9/1997 | Newman et al. ............. 235/375 |
| 5,668,636 A | 9/1997 | Beach et al. ................. 358/296 |
| 5,671,282 A | 9/1997 | Wolff et al. .................. 713/179 |
| 5,673,316 A | 9/1997 | Auerbach et al. .............. 705/51 |
| 5,687,236 A * | 11/1997 | Moskowitz et al. ........... 380/28 |
| 5,710,636 A | 1/1998 | Curry ........................ 358/3.28 |
| 5,719,939 A | 2/1998 | Tel .............................. 713/179 |
| 5,721,788 A | 2/1998 | Powell et al. ............... 382/100 |
| 5,727,092 A | 3/1998 | Sandford, II et al. ....... 382/251 |
| 5,735,547 A | 4/1998 | Morelle et al. ................ 283/67 |
| 5,740,244 A | 4/1998 | Indeck et al. ................ 713/176 |
| 5,742,845 A | 4/1998 | Wagner et al. .............. 395/821 |
| 5,745,604 A | 4/1998 | Rhoads ........................ 382/232 |
| 5,761,686 A | 6/1998 | Bloomberg ................. 707/529 |
| 5,765,152 A | 6/1998 | Erickson ......................... 707/9 |
| 5,768,426 A | 6/1998 | Rhoads ........................ 382/232 |
| 5,778,102 A | 7/1998 | Sandford, II et al. ....... 382/251 |
| 5,790,693 A | 8/1998 | Graves et al. ............... 382/135 |
| 5,790,697 A | 8/1998 | Munro et al. ................ 382/135 |
| 5,804,803 A | 9/1998 | Cragun et al. ............... 235/375 |
| 5,809,160 A | 9/1998 | Powell et al. ............... 382/100 |
| 5,809,317 A | 9/1998 | Kogan et al. .............. 707/501.1 |
| 5,817,205 A | 10/1998 | Kaule ........................ 382/294 |
| 5,818,441 A | 10/1998 | Throckmorton et al. ..... 345/717 |
| 5,819,289 A | 10/1998 | Sanford, II et al. ....... 707/104.1 |
| 5,825,871 A | 10/1998 | Mark ....................... 379/352.03 |
| 5,825,892 A | 10/1998 | Braudaway et al. ........... 380/51 |
| 5,838,458 A | 11/1998 | Tsai ............................. 358/402 |
| 5,841,978 A | 11/1998 | Rhoads ........................ 709/217 |
| 5,848,144 A | 12/1998 | Ahrens ........................ 379/219 |
| 5,848,413 A | 12/1998 | Wolff ............................. 707/10 |
| 5,852,673 A | 12/1998 | Young ......................... 382/164 |
| 5,857,038 A | 1/1999 | Owada et al. ............... 382/284 |
| 5,862,218 A | 1/1999 | Steinberg .................... 713/176 |
| 5,862,260 A | 1/1999 | Rhoads ........................ 382/232 |
| 5,866,888 A * | 2/1999 | Bravman et al. ............. 235/375 |
| 5,869,819 A | 2/1999 | Knowles et al. ............. 235/375 |
| 5,871,615 A | 2/1999 | Harris ......................... 162/140 |
| 5,872,589 A | 2/1999 | Morales ....................... 725/24 |
| 5,875,249 A * | 2/1999 | Mintzer et al. ................ 380/54 |
| 5,878,434 A | 3/1999 | Draper et al. ............... 702/202 |
| 5,892,900 A | 4/1999 | Ginter et al. ................ 713/200 |
| 5,893,101 A | 4/1999 | Balogh et al. ............... 707/100 |
| 5,898,779 A | 4/1999 | Squilla et al. ............... 713/176 |
| 5,900,608 A | 5/1999 | Iida ............................. 235/381 |
| 5,901,224 A | 5/1999 | Hecht .......................... 713/179 |
| 5,902,353 A | 5/1999 | Reber et al. ................. 709/219 |
| 5,903,729 A | 5/1999 | Reber et al. ................. 709/219 |
| 5,905,248 A | 5/1999 | Russell et al. .......... 235/462.15 |
| 5,905,251 A | 5/1999 | Knowles .................. 235/472.01 |
| 5,905,810 A | 5/1999 | Jones et al. ................. 382/135 |
| 5,913,210 A | 6/1999 | Call ............................... 707/4 |
| 5,915,027 A | 6/1999 | Cox et al. ...................... 380/54 |
| 5,930,767 A | 7/1999 | Reber et al. ................... 705/26 |
| 5,932,862 A * | 8/1999 | Hussey et al. ............... 235/462 |
| 5,932,863 A | 8/1999 | Rathus et al. ........... 235/462.15 |
| 5,933,798 A | 8/1999 | Linnartz ........................ 702/91 |
| 5,933,829 A | 8/1999 | Durst et al. .................... 707/10 |
| 5,938,726 A | 8/1999 | Reber et al. ................. 709/217 |
| 5,938,727 A | 8/1999 | Ikeda .......................... 709/218 |
| 5,939,695 A | 8/1999 | Nelson ........................ 235/383 |
| 5,940,595 A | 8/1999 | Reber et al. ................. 709/227 |
| 5,943,422 A | 8/1999 | Van Wie et al. ................ 380/9 |

| | | | |
|---|---|---|---|
| 5,946,414 A | 8/1999 | Cass et al. | 382/183 |
| 5,949,055 A | 9/1999 | Fleet et al. | 235/469 |
| 5,949,885 A | 9/1999 | Leighton | 380/54 |
| 5,950,173 A | 9/1999 | Perkowski | 705/26 |
| 5,963,916 A | 10/1999 | Kaplan | 705/26 |
| 5,971,277 A | 10/1999 | Cragun et al. | 235/462.01 |
| 5,974,141 A | 10/1999 | Saito | 705/52 |
| 5,974,548 A | 10/1999 | Adams | 713/200 |
| 5,978,773 A | 11/1999 | Hudetz et al. | 705/23 |
| 5,979,757 A | 11/1999 | Tracy et al. | 235/383 |
| 5,983,218 A | 11/1999 | Syeda-Mahmoo | 707/3 |
| 5,991,426 A | 11/1999 | Cox et al. | 382/100 |
| 6,005,501 A | 12/1999 | Wolosewicz | 341/52 |
| 6,035,177 A | 3/2000 | Moses et al. | 725/22 |
| 6,052,486 A | 4/2000 | Knowlton et al. | 382/232 |
| 6,064,764 A | 5/2000 | Bhaskaran et al. | 382/183 |
| 6,122,403 A | 9/2000 | Rhoads | 382/233 |
| 6,324,574 B1 | 9/2000 | Rhoads | 709/218 |
| 6,166,750 A | 12/2000 | Negishi | 347/131 |
| 6,266,430 B1 | 7/2001 | Rhoads et al. | 382/100 |
| 6,286,036 B1 | 9/2001 | Rhoads | 709/217 |
| 6,311,214 B1 | 10/2001 | Rhoads | 709/217 |
| 6,324,573 B1 | 11/2001 | Rhoads | 709/217 |
| 6,334,721 B1 | 1/2002 | Horigane | 400/76 |
| 6,351,815 B1 | 2/2002 | Adams | 713/200 |
| 2001/0028727 A1 | 10/2001 | Naito et al. | 382/100 |
| 2001/0031066 A1 | 10/2001 | Meyer et al. | |
| 2002/0009208 A1 | 1/2002 | Alattar et al. | 382/100 |

OTHER PUBLICATIONS

Bruckstein, A.M.; Richardson, T.J., A holographic transform domain image watermarking method, Circuits, Systems, and Signal Processing vol. 17, No. 3 pp. 361–389, 1998, This paper includes an appendix containing an internal memo of Bell Labs, which according to the authors of the paper, was dated Sep. 1994.

"High Water FBI Limited Presentation Image Copyright Protection Software," FBI Ltd brochure, Jul., 1995, 17 pages.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Kurak et al., "A Cautionary Note On Image Downgrading," 1992 IEEE, pp. 153–159.

Mintzer et al., "Safeguarding Digital library Contents and Users" Digital Watermarking, D–Lib Magazine, Dec. 1997: ISSN 1082–9873.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tanaka et al., "A Visual Retrieval System with Private Information for Image Database," Proceeding International Conference on DSP Applications and Technology, Oct. 1991, pp. 415–421.

Tanaka et al., "New Integrated Coding Schemes for Computer–Aided Facsimile," Proc. IEEE Int'l Conf. on Sys. Integration, Apr. 1990, pp. 275–281.

Tirkel et al, "Electronic Water Mark," DICTA–93, Macquarie University, Sydney, Australia, Dec., 1993, pp. 666–673.

Weber et al., "Correlative Image Registration," Seminars in Nuclear Medicine, vol. XXIV, No. 4, Oct., 1994, pp. 311–323.

Dautzenberg, "Watermarking Images," Department of Microelectronics and Electrical Engineering, Trinity College Dublin, 47 pages, Oct. 1994.

Szepanski, "Additive Binary Data Transmission for Video Signals," Conference of the Communications Engineering Society, 1980, NTG Technical Reports, vol. 74, pp. 343–351. (German text and English translation enclosed).

Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26, 1999.

Mintzer et al., "Safeguarding Digital Library Contents and Users: Digital Watermarking," D–Lib Magazine, Dec. 1997, 12 pages.

Audio Watermarking Architectures for Secure Digital Music Distribution, A Proposal to the SMDI Portable Devices Working Group by ARIS Technologies, Inc, Mar. 26, 1999, pp. 1–11.

Audio Watermarking Architectures for Persistent Protection, Presentation to SDMI PDWG, Mar. 29, 1999, J. Winograd, Aris Technologies, pp. 1–16.

Audio Watermarking System to Screen Digital Audio Content for LCM Acceptance, A Proposal Submitted in Response to PDWG99050504–Transition CfP by ARIS Technologies, Inc., May 23, 1999, Document Version 1.0, 15 pages.

Boland et al., "Watermarking Digital Images for Copyright Protection", *Fifth Int'l Conference on Image Processing and it's Application,* Jul. 1995, pp. 326–330.

Levy, "AIPL's Proposal for SDMI: An Underlying Security System" (slide presentation), Mar. 29, 1999, 23 slides..

Microsoft Response to CfP for Technology Solutions to Screen Digital Audio Content for LCM Acceptance, SDMI, PDWG Tokyo, May 23, 1999, 9 pages.

Response to CfP for Technology Solutions to Screen Digital Audio Content for LCM Acceptance, NTT Waveless Radio Consotium, May 23, 1999, 9 pages.

Sandford II et al., "The Data Embedding Method", *Proceedings of the SPIE* vol. 2615, pp. 226–259, 1996.

Thomas, Keith, *Screening Technology for Content from Compact Discs,* May 24, 1999, 11 pages.

Tirkel et al., "Electronic Water Mark," *Dicta–93,* Marquarie University, Sydney, Australia, Dec., 1993, pp. 666–672.

Vidal et al., "Non–Noticeable Information Embedding in Color Images: Marking and Detection", *IEEE* 1999, pp. 293–297.

Wolfgang et al., "A Watermark for Digital Images," *Computer Vision and Image Processing Laboratory, Purdue, University*, Sep. 1996, pp. 219–222.

U.S. patent application Ser. No. 09/761,349, Rhoads, filed Jan. 16, 2001, Class 382 Subclass 100.

U.S. patent application Ser. No. 09/765,102, Shaw, filed Jan. 17, 2001, Class 382 Subclass 199.

U.S. patent application Ser. No. 09/761,280, Rhoads, filed Jan. 16, 2001, Class 382 Subclass 100.

U.S. patent application Ser. No. 09/645,779, Tian et al., filed Aug. 24, 2000, Class 382 Subclass 100.

U.S. patent application Ser. No. 09/689,226, Brunk, filed Oct. 11, 2000, Class 382 Subclass 100.

U.S. patent application Ser. No. 09/689,250, Ahmed, filed Oct. 11, 2000, Class 382 Subclass 100.

U.S. patent application Ser. No. 09/689,293, Tian et al., filed Oct. 11, 2000, Class 382 Subclass 100.

U.S. patent application Ser. No. 09/625,577, Carr et al., filed Jul. 25, 2000, Class 382 Subclass 100.

U.S. patent application Ser. No. 09/574,726, Rhoads et al., filed May 18, 2000, Class 382 Subclass 100.

U.S. patent application Ser. No. 09/562,524, Carr et al., filed May 1, 2000, Class 382 Subclass 100.

U.S. patent application Ser. No. 09/498,223, Rhoads et al., filed Feb. 3, 2000, Class 382 Subclass 100.

U.S. patent application Ser. No. 09/465,418, Rhoads et al., filed Dec. 16, 1999, Class 382 Subclass 100.

U.S. patent application Ser. No. 09/431,990, Rhoads, filed Nov. 3, 1999, Class 380 Subclass 54.

U.S. patent application Ser. No. 09/428,359, Davis et al., filed Oct. 28, 2000, Class 382 Subclass 100.

U.S. patent application Ser. No. 09/342,972, Rhoads, filed Jun. 29, 1999, Class 382 Subclass 100.

U.S. patent application Ser. No. 09/293,601, Rhoads, filed Apr. 15, 1999, Class 382 Subclass 100.

U.S. patent application Ser. No. 09/287,940, Rhoads, filed Apr. 7, 1999, Class 382 Subclass 100.

U.S. patent application Ser. No. 09/185,380, Davis et al., filed Nov. 3, 1998, Class 382 Subclass 100.

U.S. patent application Ser. No. 09/074,034, Rhoads, filed May 6, 1998, Class 382 Subclass 100.

U.S. patent application Ser. No. 09/127,502, Rhoads, filed Jul. 31, 1998, Class 382 Subclass 100.

U.S. patent application Ser. No. 60/082,228, Rhoads, filed Apr. 16, 1998.

U.S. patent application Ser. No. 60/198,138, Alattar, filed Apr. 17, 2000.

U.S. patent application Ser. No. 60/071,983, Levy, filed Jan. 20, 1998.

U.S. patent application Ser. No. 09/404,291, Levy, filed Sep. 23, 1999, Class 713 Subclass 176.

U.S. patent application Ser. No. 60/114,725, Levy, filed Dec. 31, 1998.

U.S. patent application Ser. No. 09/234,780, Rhoads/Gustafson, filed Jan. 20, 1999, Class 382 Subclass 100.

U.S. patent application Ser. No. 60/116,641, Cookson, filed Jan. 21, 1999.

U.S. patent application Ser. No. 09/478,713, Cookson, filed Jan. 6, 2000, Class 706 Subclass 057.

U.S. patent application Ser. No. 09/342,688, Rodriguez et al., filed Jun. 29, 1999, Class 382 Subclass 100.

U.S. patent application Ser. No. 09/342,971, Rodriguez et al., filed Jun. 29, 1999, Class 705 Subclass 14.

U.S. patent application Ser. No. 09/679,261, Davis et al., filed Oct. 4, 2000, Class 345 Subclass 163.

U.S. patent application Ser. No. 09/562,517, Davis et al., filed May 1, 2000, Class 725 Subclass 110.

U.S. patent application Ser. No. 09/547,664, Rhoads et al., filed Apr. 12, 2000, Class 709 Subclass 245.

U.S. patent application Ser. No. 09/571,442, Rhoads et al., filed May 15, 2000, Class 250 Subclass 201.3.

U.S. patent application Ser. No. 09/858,189, Rhoads et al., filed May 14, 2001, Class 713 Subclass 189.

U.S. patent application Ser. No. 09/631,4097, Brundage et al., filed Aug. 3, 2000, Class 705 Subclass 40.

U.S. patent application Ser. No. 09/452,021, Davis et al., filed Nov. 30, 1999, Class 235 Subclass 414.

U.S. patent application Ser. No. 09/629,401, Seder et al., filed Aug. 1, 2000, Class 382 Subclass 100.

U.S. patent application Ser. No. 09/473,396, Evans et al., filed Dec. 12, 1999, Class 382 Subclass 100.

U.S. patent application Ser. No. 09/563,664, Levy et al., filed May 2, 2000, Class 382 Subclass 100.

U.S. patent application Ser. No. 09/670,115, Rhoads et al., filed Sep. 26, 2000, Class 382 Subclass 100.

* cited by examiner

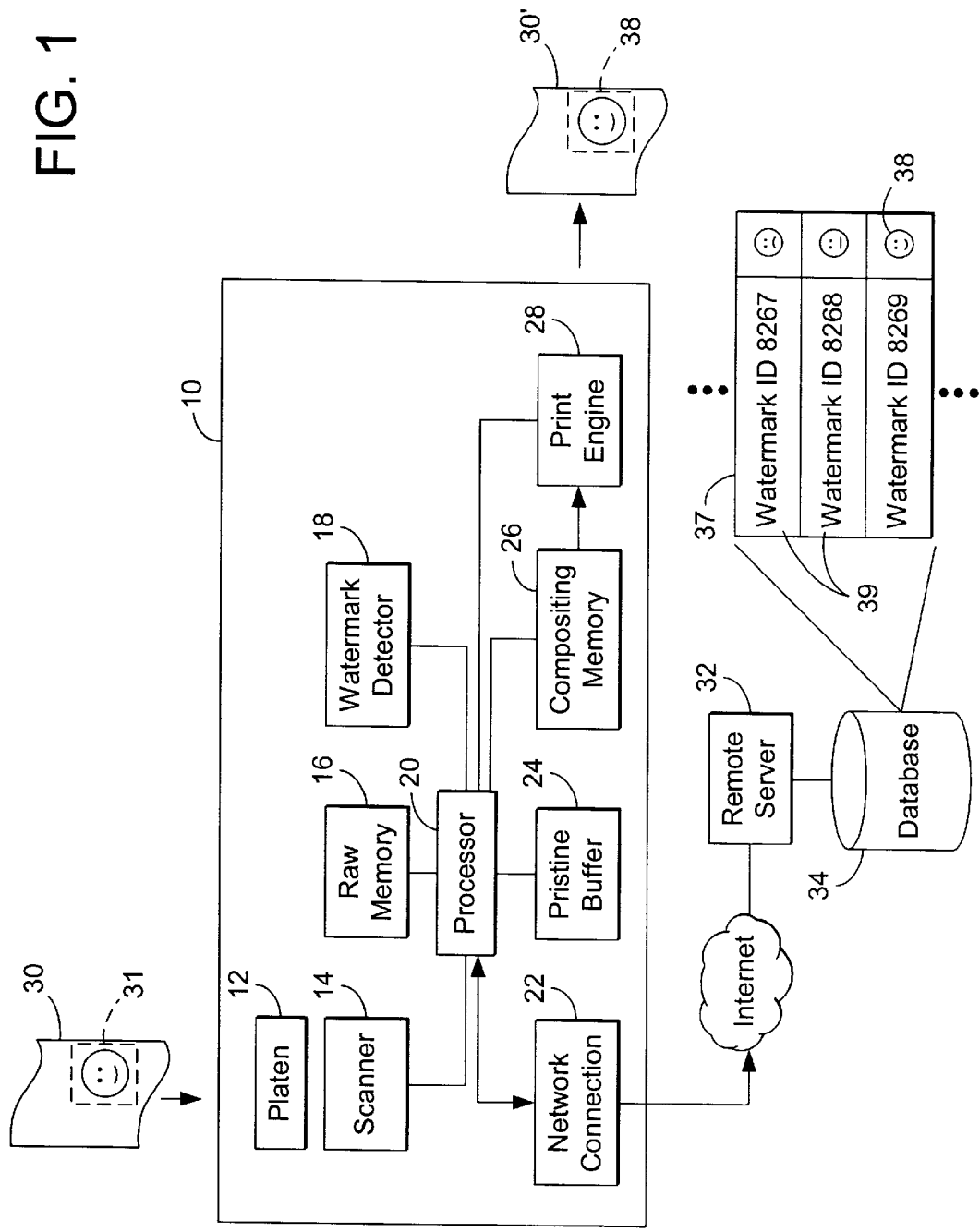

WATERMARK-BASED OBJECT LINKING AND EMBEDDING

FIELD OF THE INVENTION

The present invention relates to data processing, and more particularly relates to use of watermark technology for object substitution.

BACKGROUND AND SUMMARY OF THE INVENTION

Object linking and embedding ("OLE," sometimes also known as dynamic data exchange, or "DDE") is a well-known data processing construct by which a first digital object (e.g., a graph) can be embedded within a second digital object (e.g., a word processing document). In some embodiments, the embedding is static. That is, once the embedding takes place, subsequent changes to the first digital object (e.g., the graph) are not reflected in the second, composite digital object (e.g., the document). In other embodiments, the embedding is dynamic (and thus more commonly termed linking rather than embedding). In such arrangements, if the graph is changed, the document is automatically updated to incorporate the latest version of the graph.

The technology underlying OLE is sophisticated, but is well understood by artisans in the field. Reference may be made to the many patents (e.g., U.S. Pat. Nos. 5,581,760 and 5,581,686) and reference books (e.g., Brockschmidt, *Inside OLE 2*, Microsoft Press, Redmond, Wash., 1994) on the subject for further details.

In accordance with the present invention, OLE-like principles are implemented using watermark data in digital objects in order to effect object linking or embedding.

In one illustrative embodiment, a photocopier scans an original paper document to produce image data. This image data is analyzed for the presence of watermark data that identifies the graphic(s) on the document. With this watermark identifier, the photocopier can query a remote image database for pristine image data corresponding to the graphic(s) on the document. This pristine data can be relayed from the remote database to the photocopier and substituted into the scanned image data. Output printed from the photocopier is thus based, at least in part, on pristine image data, rather than on image data that has been subjected to various corruption mechanisms (e.g., degradation of the original paper document, artifacts due to scanning, etc.).

The foregoing and other features and advantages of the present invention will be more readily apparent from the following detailed description, which proceeds with reference to the accompanying drawings.

BRIEF DESCRIPTION OF THE DRAWINGS

FIG. 1 shows an apparatus according to one embodiment of the present invention.

DETAILED DESCRIPTION

Referring to FIG. 1, an illustrative embodiment of the present invention is a photocopier 10. The photocopier includes a platen 12, a scanner assembly 14, a raw data memory 16, a watermark decoder 18, a processor 20, a network connection 22, a pristine image buffer 24, a compositing memory 26, and a reproduction engine 28.

A paper document, such as document 30, is placed on platen 12, and scanner assembly 14 is activated to generate scan data corresponding to the document. The scanner assembly is conventional and may include a linear array of CCD or CMOS sensor elements that optically scans along an axis of the platen to generate 2D image data. Alternatively, the scanner can comprise a 2D array of sensor elements onto which an image of the document is projected through one or more lenses. In the illustrated embodiment, the document 30 includes a picture 31 that is encoded with a plural-bit digital watermark. Document 30 may be referred to as a compound document since it incorporates plural components (e.g., text and picture).

The scan data from the scanner assembly 14 is stored in the raw data memory 16, where it is analyzed for the presence of watermark data by the watermark decoder 18.

There are many different techniques by which imagery can be digitally watermarked and decoded. One is the Digimarc watermark system detailed, e.g., in U.S. Pat. No. 5,862,260, and in pending application Ser. No. 09/452,023, filed Nov. 30, 1999, the disclosures of which are incorporated herein by reference. A great variety of other systems are known. All that is required is that the watermark permit the conveyance of plural-bit auxiliary data without objectionable image degradation.

Upon detection of the watermark in picture 31, the processor 20 is programmed to initiate communication with a remote server 32 (e.g., over the internet) through the network connection 22. The programmed processor sends to the server a query message identifying the detected watermark (which may be, e.g., an identifier of 16–64 bits). A database 34 at the server 32 searches its records 37 for a digital object indexed by that watermark ID 39 and, if located, causes a pristine version of the object 38 (in this case a pristine version of the picture 31) to be sent to the photocopier.

In the embodiment illustrated, the database has the pristine version of the object stored within the database record for that watermark ID, and relays same directly back to the photocopier. In other embodiments, the object itself is not stored in the database. Instead, the database stores (in a record associated with the watermark ID) the address of a remote data repository at which the pristine object is stored. In this case the object server 32 can transmit an instruction to the remote repository (e.g., again over the internet), requesting the remote repository to provide the pristine object. The object can be sent directly from the remote data repository to the photocopier, or may be relayed through the object server 32. In any case, the pristine object may be provided in TIFF, JPEG, GIF, or other format. (In some embodiment, the request signal from the photocopier specifies the format desired, or may specify plural formats that the photocopier can accept, and the pristine object is then output by the server 32 or remote repository in such a format. In other embodiments, the request signal from the photocopier does not include any format data.)

In some embodiments, the object server 32 can be of the sort more particularly detailed in copending applications No. 60/164,619 (filed Nov. 10, 1999), and Ser. No. 09/343,104 (filed Jun. 29, 1999), the disclosures of which are incorporated herein by reference.

In addition to detecting the ID of any watermark in the scanned image data, the photocopier's watermark detector also discerns the placement of the watermarked picture within the document image, and its state (e.g., size, rotation, etc.), and produces corresponding state information. In some embodiments, this state information is passed to the object server 32, permitting the pristine object 38 to be sized/ rotated/etc. (e.g., by the object server) to match the object detected in the document image. In other embodiments, a generic version of the pristine object is passed back to the photocopier, and the processor 20 attends to sizing, rotating, etc., of the pristine picture 38 as necessary to match that of the original picture 31.

In some embodiments the picture 31 in the paper document has been cropped. (The watermark can nonetheless be detected from the cropped image.) When the pristine picture 38 is received from the remote location, it can be pattern-matched to the picture 31 detected in the original document to determine the cropping boundaries (if any), and corresponding cropping of the pristine picture can be effected.

Once the foregoing scaling/rotation/cropping, etc., adjustments (if any) have been made on the pristine picture 38 stored in buffer 24, the processed pristine picture is combined with the original document scan data in compositing memory 26, yielding a composite document image that includes the pristine picture data 38 in lieu of the scanned picture 31. (The substitution of the pristine picture for the original picture data can be accomplished by various known image processing techniques, including masking, overwriting, etc.) The composite document image is then passed to the reproduction engine 28 to produce a hard-copy output (i.e., an enhanced compound document 30') in the conventional manner. (The reprographic engine 28 can take many different forms including, e.g., xerography, inkjet printing, etc.)

The pristine picture 38 received from the server 32 can, itself, be watermarked or not. If watermarked, the watermark will usually convey the same payload information as the watermark in the original picture 31, although this need not always be the case. In other embodiments, the pristine picture 38 received from the remote server 32 has no watermark. In such case the pristine picture can be substituted into the compound document 30 in its unwatermarked state. Alternatively, the apparatus 10 can embed a watermark into the picture prior to (or as part of) the substitution operation.

If the substituted picture is watermarked, this permits later watermark-based enhancement or updating. For example, if the enhanced compound document 30' including the pristine picture 38 is printed by the photocopier, and the resulting photocopy is thereafter photocopied, the latter photocopying operation can again substitute pristine picture data for the scanned picture data produced by the second photocopier's scanner. Moreover, in applications where it is appropriate for a picture to be updated with the latest version whenever printed, the watermarking of the picture 38 permits substitution of a latest version whenever the document is scanned for printing.

In other situations, it is desirable for the picture 38 included in the enhanced compound document 30' to be unwatermarked. This is the case, for example, in certain archival applications where it is important that the document 30' not be changed after archiving. By assuring that the picture 38 is not watermarked, inadvertent changing of the picture in subsequent photocopying can be avoided. (In cases where the pristine image 38 is provided from server 32 in a watermarked state, the photocopier may remove or disable the watermark in response to corresponding instructions from a user through a user interface or the like.)

From the foregoing, it will be recognized that the illustrative embodiment can produce "photocopies" that are better than the "originals." This is accomplished by watermark-based substitution of pristine digital objects to replace less pristine counterparts.

Having described and illustrated the principles of our invention with reference to an illustrative embodiment, it will be recognized the invention is not so limited.

For example, while the invention is particularly illustrated with reference to a photocopier, the same principles are equally applicable in other systems, including personal computers (e.g., in conjunction with image editing software, such as Adobe Photoshop). In such case the input image data needn't come from a scanner but may come, e.g., from a digital file, from a network location, etc.

Likewise, while the invention is particularly illustrated with reference to picture (i.e., graphic) data, the same principles are equally applicable in connection with other data types, such as video, sound, text, etc. Moreover, the reference to "documents" is illustrative only; the invention can similarly be employed with any compound object that includes a watermarked component—whether in digital or analog form.

While the detailed embodiment is described as using separate raw data memory 16, pristine image buffer 24, and compositing memory 26, more typically some or all of these functions are served by a single memory, which may be a computer system's main RAM memory.

Likewise, while the detailed embodiment employs a processor 20 programmed in accordance with software instructions (e.g., stored in a memory or on a storage medium), in other embodiments some or all of the described functionality can be achieved using dedicated hardware (e.g., ASICs), or programmable hardware (e.g., PLAs).

Still further, while the invention is illustrated with reference to an arrangement in which a document includes a single watermarked photograph, it will be recognized that plural such watermarked components may be present in a compound document, and the system may be arranged to obtain pristine versions of each, and edit/composite same as necessary as to recreate an enhanced version of the original document.

Moreover, while the illustrative embodiment contemplates that a watermarked photograph may be a component of the original document, in other embodiments the watermarked object may comprise the entirety of the original document.

While reference has been made to substitution of pristine image components, in some embodiments it may be desirable to substitute components that are not "pristine." Indeed, in some embodiments an object may be substituted that is visually dissimilar to the original object. Consider artwork for a Christmas card. The artwork may include a watermarked "generic" corporate logo. When encountered by a computer according to the present invention, the generic logo may be replaced with a logo corresponding to the corporate owner of the computer. In such case, the substitute imagery may be stored within the computer itself, obviating the need for any network connection. The registry database maintained by the computer's operating system may include keys defined by watermark IDs. When a watermark ID is encountered, the registry database can be consulted to identify a corresponding graphic that can be substituted into the object being processed. If none is found, the watermark ID can be passed to the remote server 32.

While, for expository convenience, the illustrative embodiment was described as always substituting pristine data when available, more typically this is a function that would be enabled or disabled by an operator of the device, e.g., by an appropriate switch, button, or user interface control. In some embodiments, the device may be arranged to query the user when substitution of a pristine component is possible, in some cases presenting the user with a depiction of the image component proposed to be substituted.

The illustrative embodiment may be said to employ watermark-based object embedding, since the hard-copy output is static (i.e., cannot change) after printing. In other embodiments, the enhanced compound document 30' is not printed, but stored. Each time the compound document is utilized (e.g., opened for editing, or printed), any watermarked component(s) therein can be updated to include the latest-available version(s) of the watermarked component (s). In such case, the document may be said to employ watermark-based object linking.

In view of the many embodiments to which the principles of our invention may be applied, it should be apparent that the detailed embodiment is illustrative only and should not be taken as limiting the scope of our invention. Rather, we claim as our invention all such modifications as may fall within the scope and spirit of the following claims, and equivalents thereto.

We claim:

1. A system for producing an enhanced digital object comprising:
    a source of original object data;
    a watermark detector; and
    a data structure including a source of substitute data, the source of substitute data including at least one substitute object component that corresponds to a component found in the original object data;
    the aforesaid elements cooperating to permit substitution of the substitute object component for the original component found in the original object data by reference to watermark data encoded in the original object component, the watermark data being decoded by said watermark detector.

2. The system of claim 1 that further comprises a printing engine having an input for receiving print data that includes the substitute object component.

3. A photocopier according to claim 2, wherein the source of original object data comprises a scanner.

4. The system of claim 1 in which the data structure is located remotely from said system.

5. A method of enhancing an original digital object comprising:
    recognizing a component of the original digital object having a watermark encoded therein;
    by reference to the watermark, obtaining a counterpart to the component from a data repository, the data repository including at least the counterpart, wherein the counterpart corresponds to the component; and
    substituting the counterpart for the component in the original digital object to produce an enhanced object.

6. The method of claim 5 in which the counterpart component has a watermark encoded therein.

7. The method of claim 6 that includes removing or disabling the watermark from the counterpart component before substituting.

8. The method of claim 5 in which the counterpart component does not have a watermark encoded therein.

9. The method of claim 8 that includes encoding a watermark in the counterpart component, so that the counterpart component in the enhanced object includes a watermark.

10. The method of claim 5 in which the obtaining includes transmitting a request signal to a remote server.

11. The method of claim 10 that further includes providing the counterpart component from the remote server, wherein the remote server comprises the data repository.

12. The method of claim 10 that includes directing a request to the data repository, wherein the data repository is remotely located from the server, and providing the counterpart component from the data repository.

13. The method of claim 5 that includes sizing, rotating, and/or cropping the counterpart component prior to substituting.

14. The method of claim 13 that includes sizing, rotating, and/or cropping the counterpart component at a location different than the substituting.

15. The method of claim 5 in which the counterpart component is visually dissimilar from the component in the originate object.

16. The method of claim 5 in which the counterpart component is a graphic.

17. The method of claim 5 in which the obtaining includes consulting a registry database.

18. The method of claim 5 in which the data repository is physically co-located with a processor that performs said method.

19. The method of claim 5 that includes repeating the method, with the enhanced object as the original object, to produce a second enhanced object.

* * * * *